United States Patent [19]

Galas et al.

[11] 4,016,773
[45] Apr. 12, 1977

[54] SYNCHRONIZED GEARBOXES HAVING AT LEAST ONE NON-SYNCHRONIZED SPEED

[75] Inventors: Jacques Galas, Puteaux; Daniel Marie, Conflans, both of France

[73] Assignees: Automobiles Peugeot, Paris; Regie Nationale des Usines Renault, Boulogne-Billancourt, both of France

[22] Filed: Feb. 21, 1975

[21] Appl. No.: 551,687

[30] Foreign Application Priority Data

Mar. 6, 1974 France .......................... 74.07565

[52] U.S. Cl. .......................... 74/333; 74/339; 74/477
[51] Int. Cl.² .......................... F16H 3/22; F16H 3/16
[58] Field of Search ............ 74/342, 343, 339, 362, 74/373, 374

[56] References Cited

UNITED STATES PATENTS

| | | | |
|---|---|---|---|
| 947,637 | 1/1910 | Gray | 74/343 |
| 1,262,901 | 4/1918 | Allen | 74/342 X |
| 2,512,036 | 6/1950 | Orr | 74/339 X |
| 2,847,871 | 8/1958 | Schick | 74/343 X |

FOREIGN PATENTS OR APPLICATIONS

| | | | |
|---|---|---|---|
| 1,562,829 | 4/1969 | France | 74/343 |
| 375,708 | 7/1907 | France | 74/343 |

*Primary Examiner*—Samuel Scott
*Assistant Examiner*—Frank H. McKenzie, Jr.
*Attorney, Agent, or Firm*—Burns, Doane, Swecker & Mathis

[57] ABSTRACT

The gearbox has synchronizers and at least one speed ratio set of gears which is non-synchronized. The synchronized set of gears are actuated by parallel longitudinally movable rods. A first rod which moves the movable means is connected to a second rod which relates to one of the synchronizers by automatically withdrawable connecting means so that the beginning of the displacement from its position of rest of the first rod causes a displacement of the second rod, said displacement, which precedes the engagement of the non-synchronized set of gears, being of such extent that it just puts the synchronizers into action without engaging the corresponding speed ratio. The second rod carries a slidable sleeve having withdrawable means for connection to the second rod and means for positively driving the second rod at the same time as the first rod.

6 Claims, 2 Drawing Figures

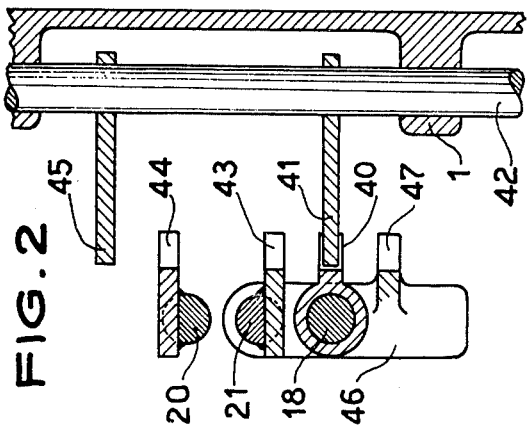
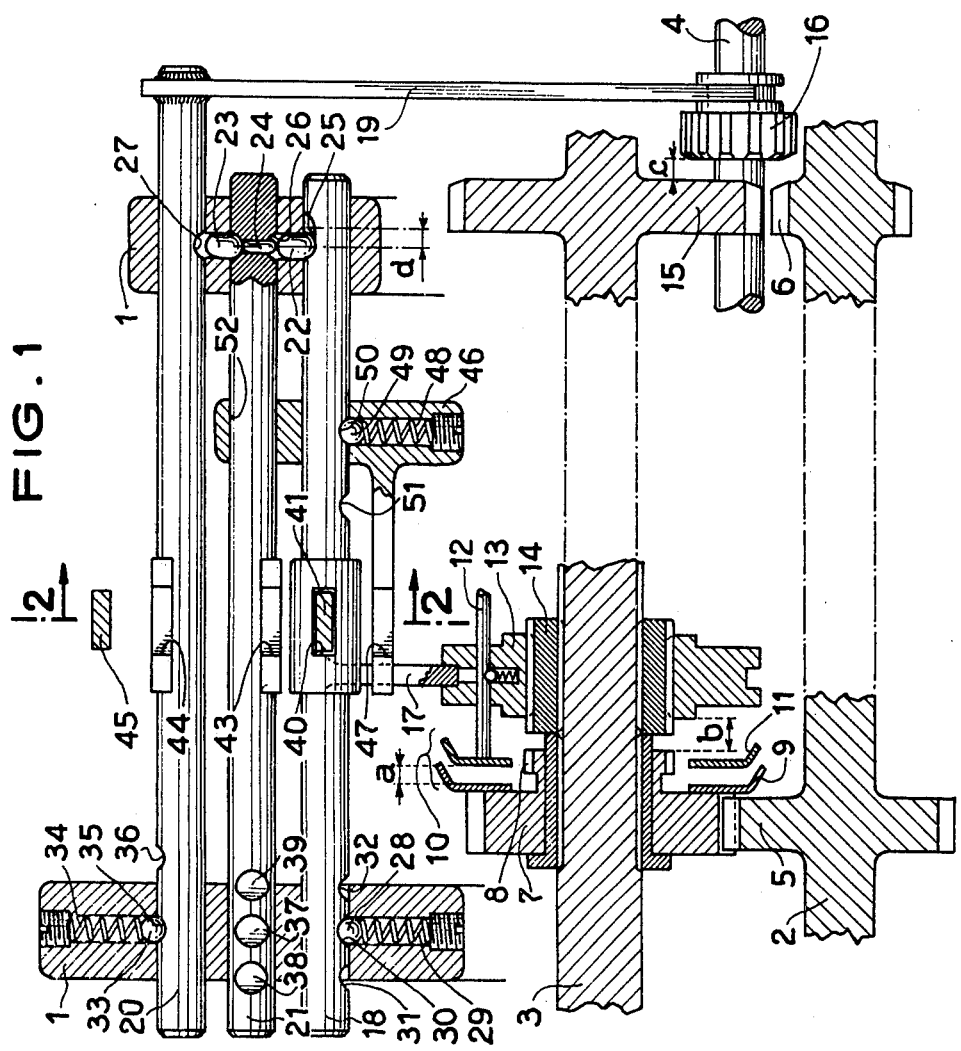

SYNCHRONIZED GEARBOXES HAVING AT LEAST ONE NON-SYNCHRONIZED SPEED

The present invention relates to gearboxes for vehicles of the type having synchronizers but having at least one speed ratio, on principle that of the reverse speed, which is non-synchronized, these synchronizers and the moving means for changing the non-synchronized speed being actuated by parallel longitudinally movable rods.

As is known, a synchronizer is a relatively complicated and expensive structure. In an automobile vehicle, the reverse speed is used must less frequently than the other speeds. Moreover, usually it is only engaged when the vehicle is stationary so that, theoretically, a synchronizer is unnecessary. Thus, in a manually-actuated gearbox, no synchronizer is provided for the reverse speed. However, it can happen that the driving or input part of the gearbox continues to rotate under the effect of inertia or a parasitic driving force while the vehicle is stationary. This of course results in a noisy engagement of the gear teeth when the reverse speed is engaged.

The invention more particularly relates to a device for holding the driving part of the gearbox stationary before the engagement of the non-synchronized speed by a braking achieved by bringing into action a synchronizer associated with another speed ratio of the gearbox.

French Pat. No. 1,562,829 describes a device which achieves this result. In this known device the rod for engaging the non-synchronized speed ratio is connected to the rod of one of the synchronizers through automatically withdrawable connecting means so that the start of the displacement, starting at its position of rest, of the rod pertaining the non-synchronized speed ratio causes a displacement of the rod connected to said synchronizer, this displacement, which precedes the engagement of the non-synchronized speed ratio, being of such extent that it just puts into action the synchronizer without engaging the corresponding speed ratio.

In this known device, it is necessary that the detent device in the neutral position of the rod of the non-synchronized speed ratio be more energetic than the withdrawable connecting system between this rod and the rod connected to the synchronizer. Indeed, if it were not so, actuation of the rod connected to the synchronizer would at the same time drive the rod corresponding to the non-synchronized speed ratio and it would be impossible to engage the synchronized speed ratio.

Now, this condition may result in an excessively rapid disengagement of the withdrawable connection between the two rods, which limits the force applicable to the synchronizer by the rod of the non-synchronized speed ratio. Consequently, in some cases there could result an insufficient braking of the driving part of the gearbox and consequently a clacking noise upon the engagement of the non-synchronized speed ratio.

An object of the present invention is to overcome this drawback.

According to the invention, there is provided a gearbox in which the rod related to the synchronizer carries a slidable sleeve having, on one hand, a withdrawable connecting means for connection to said rod and, on the other, means for positively driving it at the same time as the rod associated with the non-synchronized speed ratio.

Preferably, the sleeve is integral with a fork which in the neutral position is located in alignment with forks associated with the various rods, said fork being disposed in such manner as to be driven by a selector lever when the fork integral with the rod of the non-synchronized speed ratio is itself driven by the associated selector lever.

One embodiment of the invention is illustrated in the accompanying drawings in which:

FIG. 1 is a diagrammatic sectional view of parts of a gearbox according to the invention, and FIG. 2 is a sectional view taken on line 2—2 of FIG. 1.

In the illustrated embodiment, the invention is applied to a gearbox having four forward speed ratios and one reverse speed ratio.

The Figures show a small part of the case 1 in which there are journalled an input or primary shaft 2, an output shaft 3 and an intermediate shaft 4. The output shaft 3 is connected to the driving wheels of the vehicle through conventional transmission means (not shown). Consequently, it is stationary when the vehicle is stationary.

The primary shaft 2 carries in particular a gear 5 of the fourth speed and a gear 6 relating to reverse speed. These two pinions are integral with the shaft 2.

The gear 5 constantly meshes with a gear 7 which is freely rotatable on the shaft 3. Movable gear engaging means are combined with gear 7 to couple the latter with the shaft 3. The gear engaging means comprise lateral teeth 8 carried by the gear 7 and a friction cone 9 of a synchronizer 10 whose second friction cone 11 is integral with pins 12 which are slidably mounted in a sliding coupling member 13 which is slidably keyed on a hub 14 which is connected to rotate with the shaft 3. Such a device, of a perfectly known type, only allows the clutching of the sliding member 13 on the teeth 8 when the two parts have reached, under the action of the synchronizer, the same speed of rotation. For this purpose, the starting travel $b$ for clutching exceeds the travel $a$ for the operation of the synchronizer, that is the engagement of the two cones of the synchronizer.

The gear 6 pertaining to reverse speed can be connected to a gear 15 integral with the shaft 3 through second movable gear engaging means comprising a sliding gear 16 which is freely rotatable on the intermediate shaft 4. The starting travel of engagement of the sliding gear 16 is designated by the reference $c$. Gears 5 and 15 consequently constitute a non-synchronized set of gears.

The sliding member 13 can be driven toward the gear 7 corresponding to fourth speed or toward the third speed gear (not shown) by first shifting means comprising a fork 17 integral with a rod 18. The reverse speed sliding gear 16 is shifted by second shifting means comprising a fork 19 integral with a rod 20. The first speed and the second speed sliding gear (not shown) is shifted in an identical manner by the rod 21. The three rods 18, 20, 21 are parallel to each other and slidably mounted in the case 1, locking means ensuring their positioning and locking or inhibiting means preventing the simultaneous engagement of two speed ratios.

The inhibiting means are consituted in the known manner by bolt members 22, 23 which are slidably mounted with a close fit in the case 1 and a needle 24 which is freely slidable in a transverse aperture formed in the rod 21. The bolt members engage in corresponding recesses 25, 26, 27 formed in the rods.

The dimensions of the bolt members 22, 23 and of the interlocking needle 24 with respect to the dimensions of the rods 18, 20, 21 and to the distance between their axes, are such that it is only possible to displace a single rod at a time until the engagement of the corresponding speed ratio.

However, the recess 25 has a certain length allowing the rod 18 to be driven slightly to the left (as viewed in FIG. 1) an extent $d$ to permit interengagement of the synchronizer cones 9 and 11 when the rod 20 is itself driven to the left to engage the reserve speed as will be explained hereinafter.

The detent device for the rod 18 is constituted by a ball 28 and a spring 29 disposed in a cavity in the case 1. The ball 28 is engaged in one of the recesses 30, 31, 32 corresponding to the positions occupied by the rod 18 in the neutral, third speed or fourth speed position respectively.

The detent device for the rod 20 is constituted by a ball 33 and a spring 34 disposed in a cavity in the case 1. The ball 33 is engaged in one of the recesses 35, 36 corresponding to the positions occupied by the rod 20 for the neutral or reverse speed positions respectively of the gearbox. An identical detent device, not shown, enables the rod 21 to be put in its neutral, first speed or second speed positions by means of recesses 37, 38 and 39.

The rod 18 carries a lateral form 40 between the branches of which is engageable selector means comprising a lever 41 integral with a selector shaft 42 which is rotatably and slidably mounted in the case 1. The rod 21 carries a lateral fork 43 between the branches of which is engageable the same lever 41. The rod 20 carries a lateral fork 44 between the branches of which is engageable a lever 45 which is integral with the shaft 42 and is also part of said selector means.

Intermediate means are provided between the selector means and the first shifting means rod 18 and comprise a sleeve 46, slidably mounted on the rod 18 and carrying a fork 47 between the branches of which is engageable the lever 41 of the selector means.

Releasable fixing means are provided for fixing the sleeve 46 to the rod 18 and comprise a detent device for engaging the rod 18 and constituted by a spring 48 which biases a ball 49 into either of two recesses 50 and 51 in the rod 18. The sleeve 46 has a guiding portion 52 mounted on the neighboring rod 21, which prevents it from turning about the rod 18.

To complete the description, it should be mentioned that the detent device travels $a$, $b$, $c$, $d$ defined hereinbefore must be inter-related by the following relations:

$a < d < d$ and $a < c$.

The assembly just described operates in the following manner:

With the change speed lever of the gearbox in the neutral position, the different parts of the mechanism occupy the positions shown in the drawings.

It will in particular be observed that the forks 40, 43, 44 and 47 are in vertical alignment, the lever 41 being engaged between the branches of the fork 40 whereas the lever 45 is above the fork 44.

Rotating the selector shaft 42 in either direction causes the sliding of the rod 18 to engage either the third speed ratio or the fourth speed ratio in the usual manner. The sleeve 46, coupled by the detent device to the rod 18, moves with the latter but without being operative.

To be able to engage the reverse speed, the shaft 42 must be slid downwardly, as viewed in the drawing, so as to place the lever 45 between the branches of the fork 44 of the rod 20. This movement then brings the lever 41 between the branches of the fork 47 of the sleeve 46.

Thenceforth, rotation of the shaft 42 causes both the sliding to the left of the rod 20 and sleeve 46. Owing to the coupling of the latter of the rod 18 by the detent device the rod 18 is also driven to the left. Note that this result is reached only if the engagement between the sleeve 46 and the rod 18 by means of the detent device is stronger than the engagement of the rod 18 with respect to the case 1 by the corresponding detent device.

Starting from the beginning of the displacement to the left of the rods 20 and 18 from the neutral position thereof shown in FIG. 1, the following operations occur:

The cones 9 and 11 of the synchronizer 7 come in contact in a first position of the gear engaging means 9-14 and, owing to the good engagement of the sleeve 46 on the rod 18 by means of the detent device, it is possible to achieve a good clamping together of these two cones. As the cone 11 is connected to rotate with the output shaft 3, it is stationary if the vehicle is stationary so that it is possible to hold the cone 9, and consequently the driving part 2 of the gearbox, stationary.

The sliding movement of the rod 18 is stopped when the bolt member 22 abuts the end of the recess 25 constituting stop means, which occurs before the beginning of the coupling of the slider member coupling 13 to the teeth 8 connected to the gear 7 which is achieved in a second position of the gear engaging means 9-14 beyond the aforementioned first position thereof.

As the gear 6 has been held stationary, as indicated hereinbefore, the slider member 16 of the second gear engaging means for engaging the reverse speed can start to simultaneously engage in the teeth of the gears 6 and 15 without any unpleasant clacking noise. This operation can occur preferably after holding the rod 18 stationary, but this is not absolutely necessary.

The rod 20 continues to slide to terminate the engagement of the slider member 16 with the gears 6 and 15. At the same time, the sleeve 46 pursues its displacement whereas the rod 18 is held stationary. When the rod 20 arrives at the end of its travel, the ball 49 is in facing relation to the ramp leading to the recess 51 and this has for effect to return the rod 18 to its neutral position.

When the rod 20 returns to its neutral position, the sleeve 46 is itself returned to its initial position, the rod 18 being held stationary by the abutment of its recess 25 against the bolt member 22.

The first and second speeds are engaged in the usual way after having brought the lever 41 between the branches of the fork 43.

Having now described our invention what we claim as new and desire to secure by Letters Patent is:

1. In a gearbox comprising a case and the following elements mounted in the case: a first shaft, a second shaft, at least one set of synchronized gears comprising a first gear rotatably mounted on said first shaft and a second gear integral with said second shaft, a first movable gear engaging means combined with said first gear and comprising a synchronizer for synchronizing the rotation of said first gear with the rotation of said first shaft and coupling means for coupling said first gear with said first shaft to rotate with said first shaft, first shifting means combined with said first gear engaging means for shifting said first gear engaging means between a neutral position, a first position in which first position said synchronizer is rendered operative and a second position in which second position said coupling means is rendered operative, said second position being beyond said first position relative to said neutral position, an unsynchronized second set of gears comprising a third gear integral with said first shaft and a fourth gear integral with said second shaft, a second gear engaging means cooperative with said second set of gears and comprising a rotatable gear pinion capable of being shifted to an operative position of engagement between said third and fourth gears, and second shifting means combined with said second gear engaging means for shifting said gear pinion to said operative position; the improvement comprising intermediate means movably mounted on said first shifting means, selector means capable of cooperating simultaneously with said second shifting means and said intermediate means, releasable means for fixing said intermediate means to said first shifting means, said selector means being capable of shifting said first shifting means through the agency of said intermediate means a sufficient extent to cause said first gear engaging means to move from said neutral to said first position substantially before said selector means has shifted said gear pinion to said operative position through the agency of said second shifting means, and means for releasing said releasable means when said first gear engaging means have reached said first position and thereby precluding further movement of said first gear engaging means while said selector means continues to shift said gear pinion into said operative position through the agency of said second shifting means, said selector means being capable of cooperating solely with said first shifting means to the exclusion of said intermedite means and said second shifting means when it is desired to engage said first set of gears.

2. A gearbox as claimed in claim 1, wherein said first shifting means and second shifting means each comprise a longitudinally slidable rod and said intermediate means comprises a sleeve slidably mounted on the rod of said first shifting means and said releasable means fix said sleeve to said first shifting means rod.

3. A gearbox as claimed in claim 2, comprising a fork integral with the first shifting means rod, a fork integral with the sleeve, the selector means comprising a first lever and a second lever integral with the first lever, the two levers being simultaneously cooperative with the two forks for shifting the corresponding rods.

4. A gearbox as claimed in claim 2, comprising a rod parallel to and adjacent said first shifting means rod and means for guiding the sleeve along said adjacent rod.

5. A gearbox as claimed in claim 2, wherein said releasable means comprises spring-biased detent means interposed between said first shifting means rod and said sleeve and capable of being rendered inoperative when said first shifting means rod encounters a stop, and said means for releasing said releasable means comprises stop means cooperative with said first shifting means rod to limit the sliding of said first shifting means rod beyond a position corresponding to said first position of said first gear engaging means, said stop means being cooperative with said second shifting means rod so as to be rendered operative by the shifting of said second shifting means rod when bringing said gear pinion to said operative position of said gear pinion.

6. A gearbox as claimed in claim 5, comprising second releasable detent means for connecting the first shifting means rod to the case in two positions of the first shifting means rod respectively corresponding to said neutral position and second position of said first gear engaging means, the first-mentioned detent means being releasable upon application of a force on said first shifting means rod which is less than a force required to be exerted on said sleeve to release the first-mentioned detent means.

* * * * *